June 3, 1941.  P. BISSINGER  2,244,384

FLUID PRESSURE SUPPLY SYSTEM

Filed Nov. 20, 1939

Inventor:
Peter Bissinger,
by Harry E. Dunham
His Attorney.

Patented June 3, 1941

2,244,384

UNITED STATES PATENT OFFICE 2,244,384

FLUID PRESSURE SUPPLY SYSTEM

Peter Bissinger, Berlin, Germany, assignor to General Electric Company, a corporation of New York Application November 20, 1939, Serial No. 305,467
In Germany November 1, 1938

3 Claims.  (Cl. 60—57)

The present invention relates to fluid pressure supply systems, and more particularly to systems of this type adapted for supplying fluid under pressure to a plurality of intermittently operated devices such as electric circuit breakers of the fluid pressure-operated type.

In installations of fluid pressure-operated electric circuit breakers it is essential to provide a supply of fluid at a pressure and in sufficient quantities to insure the proper operation of the breaker at all times. Since the interval of time between the switching operations varies greatly, it is necessary to provide a system which will in emergency supply large quantities of fluid at a pressure above the minimum required for operating the switches. At the same time it is desirable to keep the fluid pressure supply system reasonably small and inexpensive.

It is an object of this invention to provide a fluid pressure supply system which is particularly adapted for supplying operating fluid to intermittently operated devices, which provides for a large storage of fluid under pressure and which may be quickly restored to the required minimum operating pressure in the event that repeated operations of the fluid-operated devices momentarily reduce the pressure of the system below the required minimum.

Figure 1:
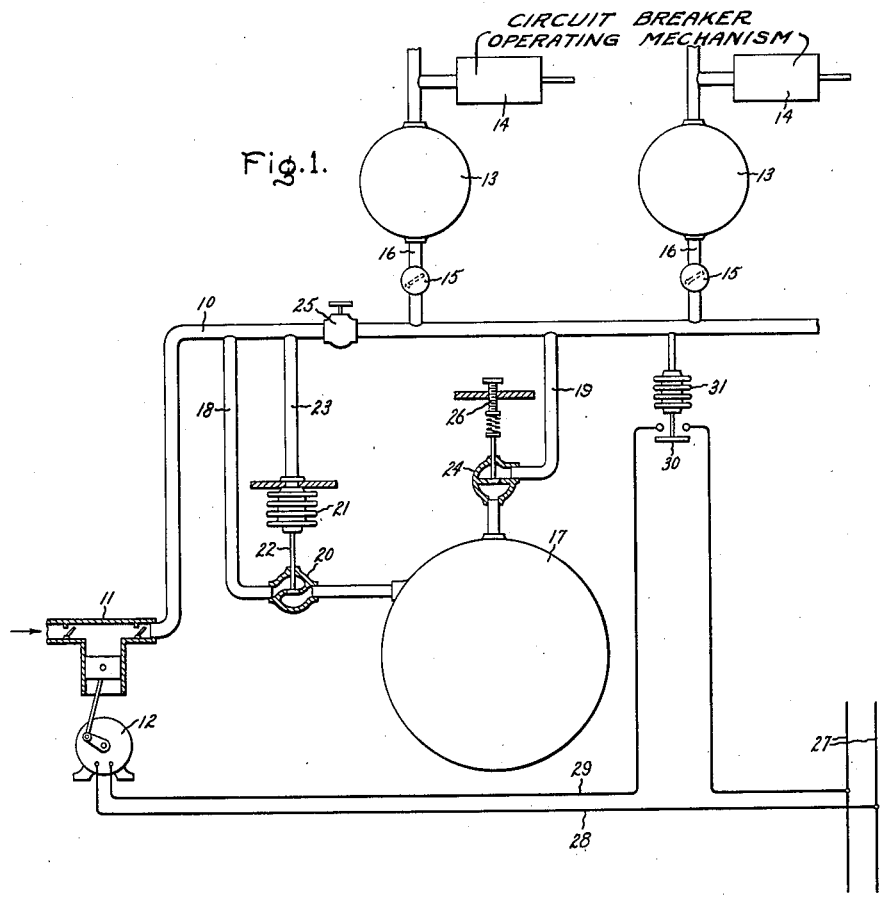
Figure 2:
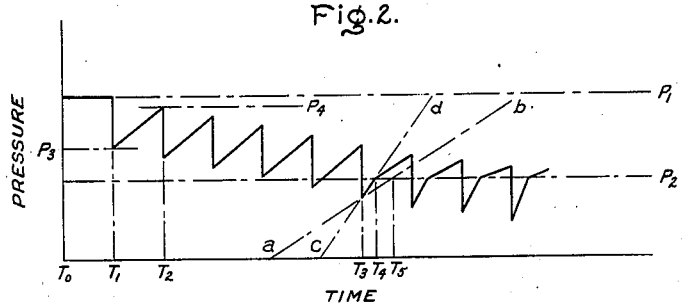

Further objects and advantages of the present invention will become apparent as the following description proceeds, reference being had to the accompanying drawing in which Fig. 1 is a schematic diagram of a fluid pressure supply system embodying the invention, and Fig. 2 is a pressure-time diagram showing variations in the pressure of the system occurring during repeated operation of the fluid-operated devices.

Referring to Fig. 1 of the drawing, I have shown my invention embodied in a system comprising a main supply conduit 10 connected at one end to the output of a compressor 11 which may be driven by any suitable means such as an electric motor 12. Connected to the supply conduit are a plurality of pressure tanks 13 corresponding in number to the switches or other devices to be operated. Each of the pressure tanks 13 is connected to the operating cylinder 14 of its associated circuit breaker (not shown) by suitable conduits and connections. It is understood that in the case of gas blast circuit breakers the storage tanks 13 provide gas for the arc-extinguishing blast as well as the operating medium for the breaker contacts. The storage tanks 13 are comparatively small and are dimensioned to contain sufficient fluid for one or two switching operations. A check valve 15 is placed in each of the conduits 16 which connect the pressure tanks 13 with the main supply conduit 10 in order to maintain the fluid under pressure in the pressure tanks in intimate relation with the switch-operating mechanism and isolated from the supply conduit.

A reserve supply of fluid is provided by a main storage reservoir 17 of comparatively large capacity connected in parallel relation with a portion of the main supply conduit 10 by conduits 18 and 19. The latter conduits are provided with suitable valves and arranged in such a manner that the storage reservoir is automatically connected to receive fluid from the compressor whenever the conduit 10 and tanks 13 are at a pressure above that required for operating the circuit breaker or other fluid pressure-operated device and to supply fluid to the conduit 10 whenever the pressure in the storage tank exceeds that of the conduit 10. To this end a pressure responsive valve 20 is positioned in the conduit 18 and is controlled in response to the pressure of the main supply conduit by a bellows 21 which is secured at one end to a valve stem 22 of the valve 20. The interior of the bellows communicates with the supply conduit 10 through a conduit 23 so that expansion of the bellows, resulting in opening movement of the valve 20, occurs with an increase in pressure in the conduit 10. A check valve 24 is provided in the conduit 19 to prevent the flow of fluid therethrough from the main conduit to the storage tank.

A throttle valve 25 positioned in the main supply duct between the conduits 18 and 19 provides manual means for diverting all of the output of the compressor from the supply duct into the main storage reservoir. The valve 25 may be a pressure-reducing valve if desired, so that the fluid stored in the reservoir 17 may be maintained at a higher pressure than the storage tanks 13 associated with the individual circuit breakers. When a pressure-reducing valve is used, it is necessary to provide means for maintaining a pressure differential between the storage tank and the conduit 10 and to this end the valve 24 may be provided with an adjustable spring biasing means 26. If the reservoir 17 and the individual pressure tanks 13 are to be maintained at the same pressure under normal conditions, the valve 24 may be a conventional check valve.

The energization of the driving motor 12 of the compressor from power supply lines 27 through leads 28 and 29 is controlled in accordance with the pressure in the tanks 13 and the supply conduit 10 by a bridging contact 30 which is operated in response to the pressure in the main supply conduit by means of a pressure responsive bellows 31.

The operation and advantages of the present invention will be better understood from a consideration of the diagram of Fig. 2 which shows the pressure variation in the main conduit 10 and pressure tanks 13 upon the occurrence of a series of switching operations occurring at equal time intervals. Referring to Fig. 2, the maximum pressure of the system is indicated at $P_1$ and the minimum operating pressure for the driven devices is indicated at $P_2$. As indicated by the heavy line, the system is at pressure $P_1$ at time $T_0$, at which time the circuit of the compressor driving motor is maintained open by the bellows 31. If a switching operation occurs at time $T_1$, the pressure in the entire system is immediately reduced to a value $P_3$. The reduction in pressure causes the bellows 31 to close the circuit of the compressor driving motor and the pressure builds up at a rate depending on the output of the compressor and the volume of the entire system until a pressure $P_4$ is reached at time $T_2$ at which time another switching operation occurs. Repeated switching operations at equal intervals of time cause the pressure to vary as indicated until, at the time $T_3$, the system pressure falls below the desired minimum pressure $P_2$. At this time the valve 20 is closed by the bellows 21 and the pressure in the main conduit 10 and the individual pressure tanks 13 builds up at a rate dependent upon the output of the compressor and the supply system exclusive of the main storage reservoir 17. As illustrated in the drawing the pressure builds up along the line $c$—$d$ and reaches the value $P_2$ at time $T_4$. If the reservoir 17 were left connected to the compressor the system pressure would increase along the line $a$—$b$ and the pressure tanks 13 would not reach the pressure $P_2$ until time $T_5$. The reduction in time required to bring the tanks 13 back to a pressure $P_2$ is more pronounced as repeated switchings further reduce the system pressure as indicated in the diagram. In practice the bellows 21 and valve 20 are adjusted to operate at a pressure slightly above the minimum pressure required for the safe operation of the switch contacts.

From the description of the operation of the apparatus embodying the present invention, it is apparent that a large reserve supply of fluid under pressure is maintained in the main storage tank 17. At the same time the volume of the system which must be refilled by the compressor is automatically reduced when the system pressure falls below the minimum operating pressure. This permits the use of a smaller compressor without increasing the time required to bring the system back to the minimum operating pressure. In other words, in an emergency the time required to restore the system pressure to a safe operating value is independent of the size of reserve storage space provided. At the same time, the reserve capacity is automatically refilled as soon as the pressure in the individual switch tanks is brought to a proper operating value.

While I have shown and described a particular construction embodying my invention, it will be apparent to those skilled in the art that many modifications may be made, and I intend in the appended claims to cover all constructions falling within the true spirit and scope of my invention.

What I claim as new and desire to secure by Letters Patent of the United States is:

1. A gas pressure supply system for electric circuit breakers of the type adapted to be operated intermittently and requiring a minimum gas pressure in operation, the combination comprising a supply conduit, means for supplying gas under pressure to said conduit, a reserve storage tank connected with said supply conduit by a pair of parellel passages, pressure responsive means in one of said parallel passages for controlling the flow of fluid from said supply conduit to said storage reservoir in response to the pressure of said supply conduit, valve means in the other of said passages preventing the flow of fluid therethrough from said supply conduit to said storage reservoir, a plurality of pressure tanks each for supplying gas to an electric circuit breaker and each connected to said supply conduit independently of each other and independently of the valve controlled passages connecting said supply conduit with said storage reservoir, each of said pressure tanks having a capacity sufficient to supply the gas under pressure required for at least one operation of the circuit breaker supplied thereby.

2. A gas pressure supply system for electric circuit breakers of the type adapted to be operated intermittently and requiring a minimum gas pressure in operation, the combination comprising a supply conduit, a plurality of pressure tanks each for supplying gas under pressure to an electric circuit breaker and each connected to said conduit independently of each other, each of said pressure tanks having a capacity sufficient to supply the gas under pressure required for at least one operation of the circuit breaker associated therewith, a source of gas under pressure connected to said conduit and pressure tanks, and a main storage reservoir communicating with said conduit to supply gas to said conduit whenever the pressure in said storage reservoir is higher than the pressure in said conduit, means connecting said storage reservoir to said source of gas, and means including pressure responsive means preventing the flow of gas to said storage reservoir when the pressure in said supply conduit is less than said minimum pressure.

3. A gas pressure supply system for electric circuit breakers of the type adapted to be operated intermittently and requiring a minimum gas pressure in operation, the combination comprising a main conduit, a source of gas under pressure connected to said conduit, a reservoir connected with said main conduit for receiving gas under pressure from and supplying gas under pressure to said main conduit under certain predetermined conditions of pressure in said conduit and said reservoir, means including a pair of valve controlled passages for determining the pressure conditions under which gas is transmitted between said conduit and said reservoir and effective to prevent a supply of gas to said reservoir whenever the pressure in said main conduit falls below said minimum and a pressure tank connected with said supply conduit for receiving gas therefrom independently of the valve controlled passages interconnecting said main conduit and said reservoir, said pressure tank having a capacity sufficient to supply the gas required for at least one operation of a circuit breaker supplied thereby.

PETER BISSINGER.